Oct. 3, 1961 J. TULTS ET AL 3,003,029

TELEVISION RECEIVER FINE TUNING INDICATION SYSTEM

Filed May 9, 1958 2 Sheets-Sheet 1

INVENTORS
JURI TULTS &
BY PETER H WERENFELS

ATTORNEY

Oct. 3, 1961 J. TULTS ET AL 3,003,029

TELEVISION RECEIVER FINE TUNING INDICATION SYSTEM

Filed May 9, 1958 2 Sheets-Sheet 2

INVENTORS
JURI TULTS &
PETER H. WERENFELS
BY [signature]
ATTORNEY

United States Patent Office 3,003,029
Patented Oct. 3, 1961

3,003,029

TELEVISION RECEIVER FINE TUNING INDICATION SYSTEM

Juri Tults and Peter H. Werenfels, Princeton, N.J., assignors to Radio Corporation of America, a corporation of Delaware Filed May 9, 1958, Ser. No. 734,328
8 Claims. (Cl. 178—7.5)

This invention relates generally to tuning indicators, and more particularly to fine tuning indication systems for television receivers.

The accurate adjustment of fine-tuning control of a television receiver, while an art difficult for some viewers to master, is an important factor in determining the quality of the reproduced picture. This is particularly true of color television receivers which are responsive to both monochrome and color television signals. It has been found that fine tuning control settings which permit acceptable monochrome reception may be so inaccurate that the receiver operation for succeeding color programs on the same channel are highly unsatisfactory, even to the extent that the color television signal may be reproduced as a monochrome image.

It is an object of this invention to provide an improved tuning indication system for television receivers.

It is another object of this invention to provide an improved fine tuning indication system for television receivers which enables rapid and accurate setting of the fine tuning control.

A further object of this invention is to provide an improved fine tuning indicator for television receivers which provides a viewer with an easily discernible indication in the event that the receiver is not properly tuned to the desired television channel.

A still further object of this invention is to provide an improved fine tuning indication circuit for television receivers which is of simple construction, and provides stable operation with only a small number of component parts.

In accordance with the invention a visual display on the screen of the kinescope provides an indication of receiver fine tuning error. Preferably the visual display comprises either a horizontal or a vertical tuning error indicating line which appears at one edge of the picture for mistuning in one direction and at the opposite edge of the picture for mistuning in the opposite direction to indicate the direction of tuning error. The line disappears off the edge of the picture when the receiver is properly tuned.

To produce the tuning indication line, a circuit including a monostable multivibrator is keyed by a pulse derived from the vertical deflection circuits for a horizontal tuning error indicating line, or from the horizontal deflection circuits for a vertical tuning error indicating line. The multivibrator output signal is processed to provide an indicating signal which is suitably coupled to the kinescope. The relative timing of the indicating signal which controls the position of the tuning line appearing on the kinescope screen, is controlled by a control voltage indicative of the receiver fine tuning.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
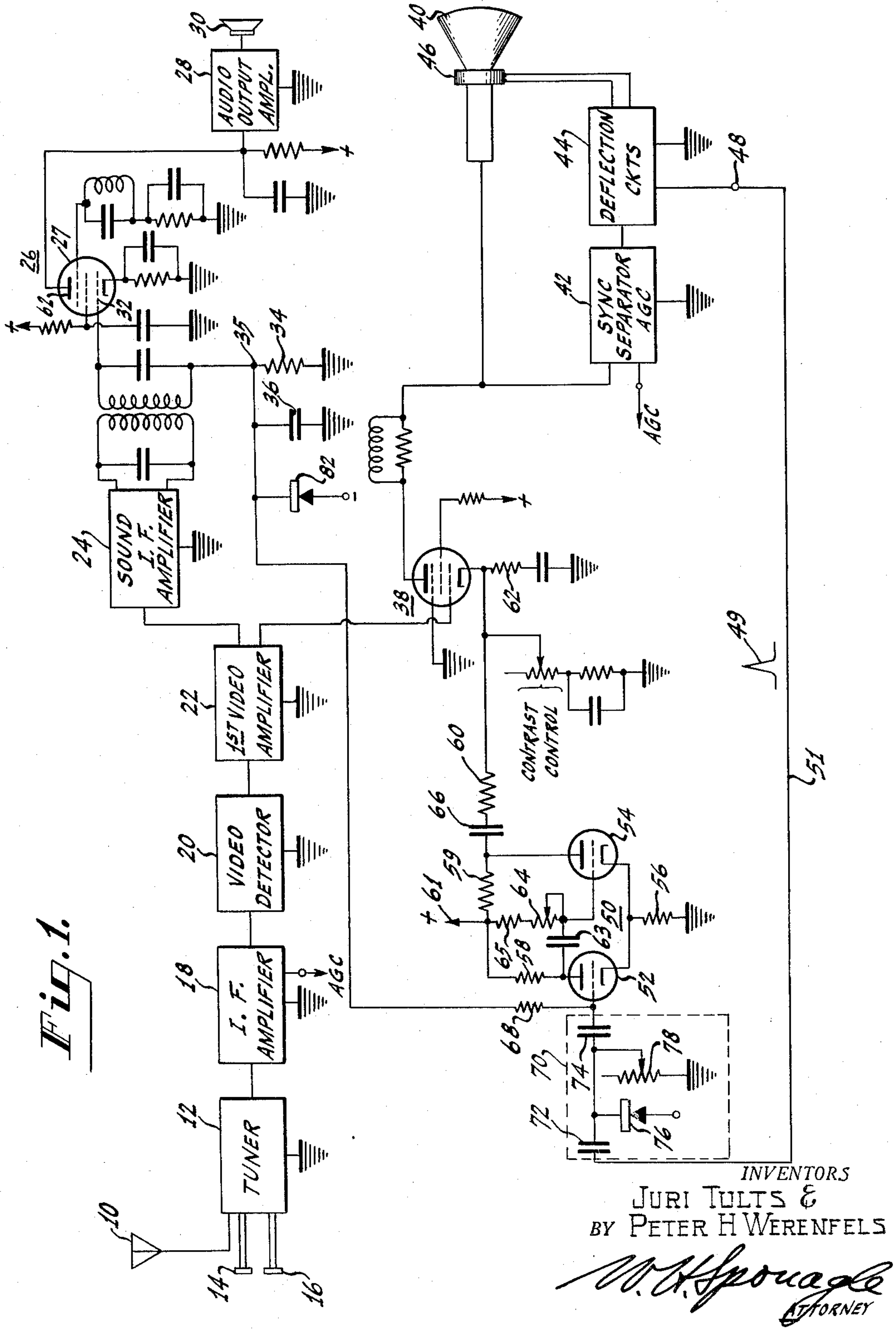
FIGURE 1 is a schematic circuit diagram, partly in block form, of a television receiver including a circuit for producing a tuning error indicating line on the kinescope screen in accordance with the invention.

With reference to FIGURE 1, the television receiver is connected by a suitable transmission line to an antenna 10 which is responsive to signals in the television band. In accordance with present standards the transmitted television signals comprise a sound carrier and a picture carrier, the frequencies of which are 4.5 mcs. apart. Specifically, the antenna 10 is coupled to a tuner 12 which includes the usual tunable signal selection circuits for selecting any one of a plurality of transmitted television signals. The tuning of the signal selection circuits is controlled by a main tuning control knob 14.

As is conventional, the tuner 12 also includes an R.F. amplifier, a signal mixer and oscillator (not shown). The oscillator produces a wave which is heterodyned with the selected television signal in the signal mixer to produce a corresponding signal of intermediate frequency (I.F.). By way of example, the picture and sound I.F. carrier frequencies may be at 45.75 and 41.25 megacycles (mcs.) respectively. To insure that the I.F. signals will be of the correct frequency, the tuning of the local oscillator may be controlled over a limited range by a tuning element which is mechanically coupled to a fine tuning control knob 16.

The resulting I.F. television signal is amplified in an intermediate frequency amplifier 18 and detected in a video detector 20 to derive the modulation components of the I.F. signal. The modulation components which comprise a composite signal including video and synchronizing information as well as a 4.5 mcs. intercarrier sound signal, are amplified in a first video amplifier 22 before application to other circuits in the receiver.

The 4.5 mcs. intercarrier sound signal which results from the heterodyning of the sound and picture I.F. carrier waves in the video detector 20 is fed to a sound intermediate frequency amplifier 24. Amplified signals from the sound I.F. amplifier 24 are applied to a sound frequency modulation detector 26 which is shown as a quadrature grid or product type detector. The resultant audio signal derived from the output circuit of the detector 26 is fed to an audio power amplifier stage 28 prior to application to a loudspeaker 30.

The quadrature grid detector 26 includes a tube 27 which is designed to limit the signal at the input electrode 32 thereof under ordinary operating conditions. By providing a grid leak bias circuit for the detector tube 27 comprising a resistor 34 and a capacitor 36, the D.C. bias variation on the input electrode 32 is proportional to the amplitude of the input signal. Since the I.F. sound carrier is sharply attenuated in the circuits of the I.F. amplifier 18, any mistuning causes a relatively large amplitude change therein. Hence, the amplitude of the 4.5 mcs. intercarrier sound signal serves as a good indication of the local oscillator tuning.

Figure 2:
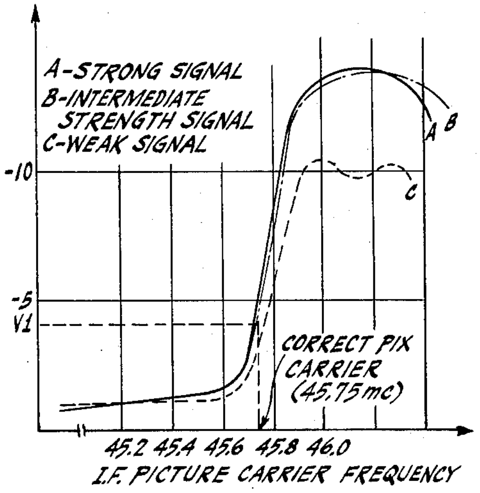
FIGURE 2 is a graph showing the relative voltage output at the receiver sound detector with changes in the tuning of the receiver local oscillator.

Some typical curves of the D.C. voltage changes which appear across the resistor 34 as the oscillator tuning is varied are shown in FIGURE 2. It is essential in this case that signal limiting in the sound I.F. amplifier 24 does not occur over the complete fine tuning range. As the oscillator is tuned from about 100 kcs. below to about 10 kcs. above its proper operating frequency, the D.C. voltage rises with a steep slope from a very low value to a maximum value which is determined by the limiting characteristics of the preceding sound I.F. amplifier 24. For strong and intermediate strength signals at the antenna 10 (curves A and B respectively in FIGURE 2), the curves do not change appreciably since the receiver AGC action tends to keep the signal level reasonably constant. With an input signal level insufficient to produce an acceptable picture, the peak value of the D.C. voltage is reduced but the characteristic rise of the curve still occurs approximately over the same frequency range (curve C of FIGURE 2).

Figure 3:
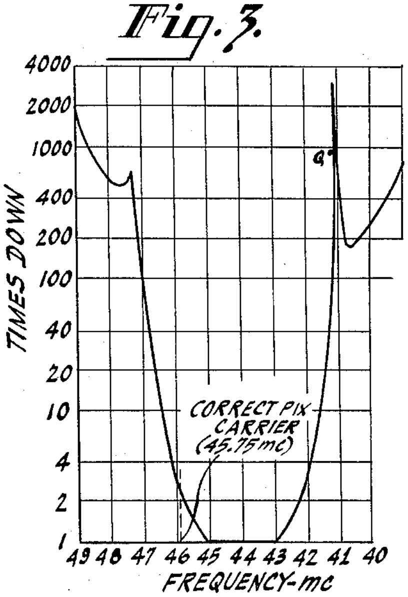
FIGURE 3 is a graph illustrating the overall frequency response of the intermediate frequency amplifier of the receiver shown in FIGURE 1.

The reason for the rapid change in amplitude of the 4.5 mcs. intercarrier sound signal over a narrow frequency range, and hence the variation of the D.C. voltage appearing at the terminal 35 of FIGURE 1 may be explained from the graph of FIGURE 3 which shows the frequency response characteristic of the intermediate frequency amplifier 18. It can be seen from FIGURE 3 that the response curve has a much steeper slope in the vicinity of the sound carrier (41.25 mcs.) than near the picture carrier (45.75 mcs.). Therefore, the amplitude of the I.F. sound carrier changes much more rapidly than the picture carrier as the oscillator is tuned through its correct frequency. Consequently, in this region, the amplitude of the 4.5 mcs. intercarrier sound signal is primarily determined by amplitude variations of the I.F. sound carrier (nominally 41.25 mcs.). Of course, as the oscillator is tuned far from its proper frequency, the amplitude variations of the picture carrier will start to affect the 4.5 mcs. signal appreciably, as shown by the eventual drop of the curves in FIGURE 2 for higher oscillator frequencies.

The curve of FIGURE 3 shows that in view of the mode of operation of the tuning indicator circuit described herein, the sound carrier does not fall into the "notch" in the I.F. amplifier 18 frequency response curve under proper tuning conditions (sound carrier is located at point Q in FIGURE 3). This causes increased attenuation of the sound I.F. carrier as the local oscillator tuning is varied in one direction and decreased attenuation of the sound carrier as the oscillator tuning is varied in the other direction. Thus, the voltage at terminal 35 of the sound detector of FIGURE 1 is suitable for indicating the local oscillator tuning since it increases as the local oscillator is tuned in one direction from the correct setting, and decreases as the local oscillator is tuned in the other direction.

The output of the video amplifier 22 is also passed to a second video amplifier 38 for amplification prior to application to a kinescope 40. It is to be understood that, in the case of color television reception, suitable color processing circuits may be also driven from the first video amplifier 22 for the purpose of deriving the various signals representative of the colors to be reproduced. The signal output from the video amplifier 38 also is applied to a synchronizing signal separator and AGC stage 42 which operates to separate the horizontal and vertical synchronizing pulse components from the composite video wave and to produce an AGC signal for the I.F. amplifier 18 through the indicated connections whereby to control the gain of this stage inversely with signal strength. The separated synchronizing pulses are applied to the deflection circuits 44 for the purpose of generating suitable horizontal and vertical scanning signals for application to the deflection yoke 46 surrounding the neck of the kinescope 40. The deflection circuits 44 include a terminal 48 at which a pulse 49 is available and which occurs at the start of the retrace interval of the horizontal or vertical deflection waveform. In other words, for one mode of operation of the tuning indicator circuit it is necessary to have pulses which recur at the vertical field rate, and in a second mode of operation pulses at the horizontal line rate are required. The pulse at the terminal 48 is applied by way of a conductor 51 to a monostable multivibrator circuit 50, which produces a signal for indicating the fine tuning error on the kinescope 40 screen.

In the first form of the invention to be described, the multivibrator is connected to produce a horizontal tuning error indicating line on the kinescope screen which appears at the top of the screen for mistuning in one direction, and at the bottom of the screen for mistuning in the other direction. The line disappears when the receiver is properly tuned. This requires a triggering pulse occurring at the vertical field rate.

The monostable multivibrator consists essentially of a pair of tubes 52 and 54 which have a common cathode resistor 56. A pair of resistors 58 and 59 are connected between the positive terminal 61 of an operating potential supply source and the anodes of the tubes 52 and 54, respectively. The control electrode of the tube 54 is connected to the anode of the tube 52 through a coupling capacitor 63, and to the operating potential supply terminal 61 through a variable resistor 64 and a fixed resistor 65.

In steady state, the grid of tube 54 is clamped to its cathode potential and tube 54 is, therefore, heavily conducting. The potential developed by the current of tube 54 across the cathode resistor 56 is of such magnitude as to cause tube 52 to be cut off.

The multivibrator 50 is triggered into a quasi-stable state by positive pulses appearing at the deflection control circuits terminal 48 and applied through a network 70 to the control electrode of the tube 52. The network 70, in addition to the coupling capacitors 72 and 74 includes a rectifier 76 for clipping any negative pulses accompanying the triggering pulses, and a variable resistor 78 which permits the adjustment of the pulse amplitude applied to the tube 52.

The positive triggering pulses cause the tube 52 to conduct, thereby decreasing the anode voltage thereof. This causes a charging of the capacitor 63 through the resistors 64 and 65, to produce a voltage sufficient to cut off the tube 54. The duration of the cut-off state of tube 54, and hence the duration of the quasi-stable state, is initially controlled by the time constant of the network including the resistors 64 and 65 and the capacitor 63.

It will be seen that the length of time that the cut-off bias will be maintained on the tube 54 is also a function of the change in voltage at the anode of the tube 52 when the multivibrator is triggered from the stable to the quasi-stable state. In other words, a large change in voltage at the anode of tube 52 will cause the tube 54 to be cut off longer than a smaller change in plate voltage. The amount of current that the tube 52 will conduct during the quasi-stable operating condition of the multivibrator is a function of the D.C. control voltage applied to the control electrode thereof from the terminal 35 of the sound detector 26.

Figure 4:
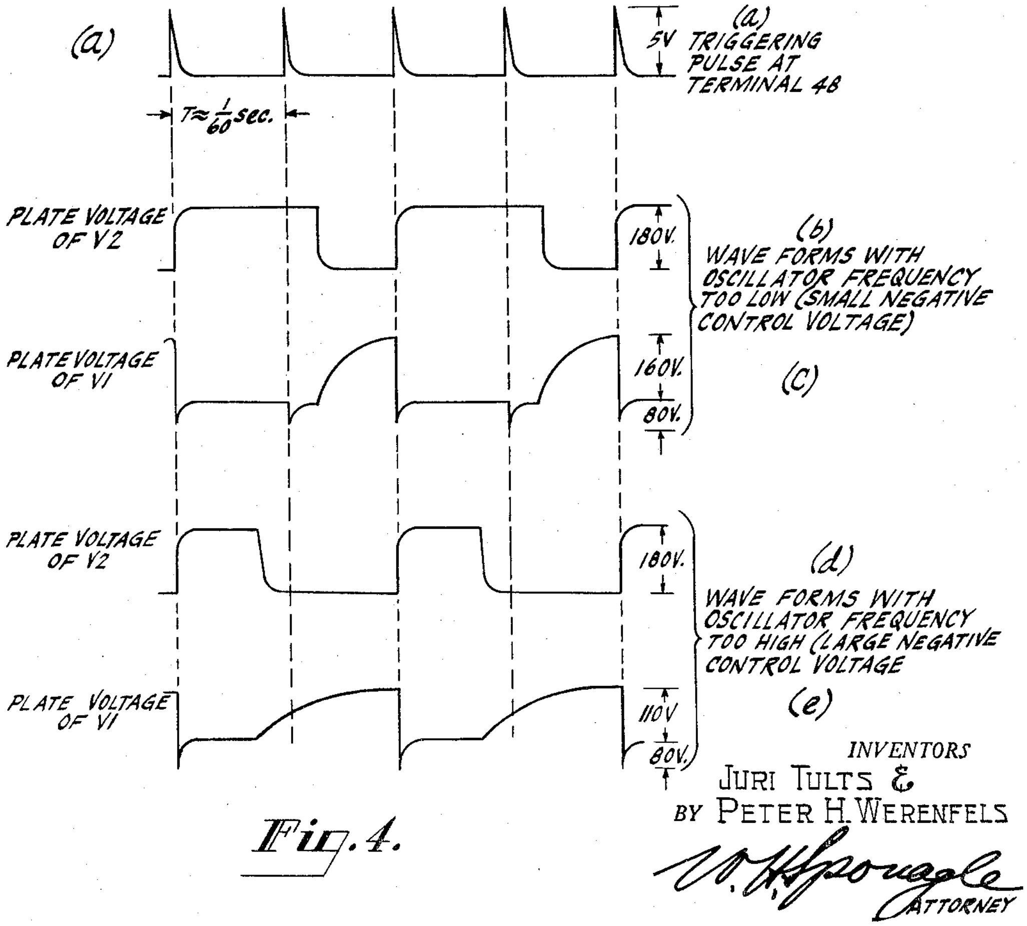
FIGURES 4*a*, *b*, *c*, *d*, and *e* illustrate the waveforms appearing at the anodes of the multivibrator stages used in the tuning indicator circuit of FIGURE 1, in time relation to pulses recurring either at the vertical field, or horizontal line rate.

As the control voltage is made more positive by changing the fine tuning, the tube 52 will conduct more current after being triggered on and therefore the voltage drop across its anode resistor 58 increases. Thus, there is a greater net change in plate voltage between the stable and quasi-stable conditions for more positive control voltages, so that the duration of the quasi-stable stage increases as shown in FIGURES 4*b* and 4*c*. Since the period is now longer than the duration of a single field, only every other triggering pulse is effective to trigger the tube 52 into conduction. The waveform appearing at the anode of the tube 54 is differentiated in a circuit including the resistors 60 and 62 and the capacitor 66 to produce a negative pulse which is applied to the cathode of the video amplifier 38. Since the differentiated pulse will occur at the trailing edge of the waveform produced at the anode of the tube 54, which occurs shortly after every other vertical retrace pulse, a bright horizontal tuning error indicating line will be visible at the top of the kinescope picture screen.

In case the oscillator is detuned in the opposite direction which makes the voltage on the grid of the tube 52 more negative, the duration of the quasi-stable state is decreased as shown in FIGURES 4*d* and *e*. It can be be seen that the tendency exists to trigger the multivibrator by each successive vertical pulse (60 c.p.s. rate). To prevent unstable operation near the value of control voltage corresponding to proper tuning, the recovery time constant of the anode circuit of the tube 52 is made very large as indicated by the corresponding waveforms in FIGURES 4*c* and *e*.

The amplitude of the triggering pulses applied to the tube 52 is chosen to be sufficiently small so that the pulses cannot trigger the tube 52 into conduction during the interval when its plate voltage is recovering. Exemplary voltage values are indicated in FIGURES 4*a*, *b*, *c*, *d*, and *e*. Since the differentiated pulse again occurs at the trailing edge of the waveform shown in FIGURE 4*d*, which is slightly prior to every other vertical triggering pulse, a bright tuning error indicating line appears at the bottom of the picture.

In order to confine the horizontal bar to a region close to the lower edge of the picture, a clamp circuit including a rectifier 82 is connected between the control voltage source and the negative terminal of a D.C. operating supply to limit the negative swing of the voltage which may be applied to the control electrode of the tube 52.

Under proper operating conditions of the circuit the multivibrator output pulse to the video amplifier 38 occurs during the vertical retrace interval. Accordingly, the bar does not appear on the picture screen. Any vertical retrace blanking signal used in the receiver should be of sufficient amplitude to overcome the unblanking effect of the multivibrator pulse.

It is to be understood that the tuning indication system of the invention as shown in FIGURE 1 may also be used to produce a vertical tuning indication line on the screen of the kinescope 40. This may be accomplished by decreasing the time constant of the multivibrator circuit including the resistors 64 and 66 and the capacitor 62 to obtain a quasi-stable state comparable in duration to that of one horizontal line. Additionally, the triggering pulses at terminal 48 should be obtained from the horizontal deflection circuits at the horizontal scanning rate. A serrated bright vertical bar will then appear near the right or left hand edge of the television screen depending upon the sense of the tuning error. Otherwise, a circuit for producing a vertical tuning indication bar operates in the same manner as that described above for producing a horizontal tuning indicator bar.

It should be noted that the control voltage indicative of the fine tuning control setting may be derived from other points than that shown. For example, in receivers utilizing a ratio detector, the control voltage may be derived from the stabilizing capacitor employed therein. If desired, the control voltage could also be derived from a tuned element in a sound carrier trap in the I.F. amplifier 18.

The tuning error circuit described provides the viewer with an easily discernible indication of the existence of any tuning error, which is not so objectionable as to necessitate immediate correction of the tuning. Furthermore, the tuning indication system of the invention shows the direction of tuning error over the complete range of usable signal levels.

We claim:

1. A tuning indication circuit for television receivers of the type including a picture reproducing device and deflection means for producing scanning signals having a retrace interval associated with said picture reproducing device, comprising: means connected in said receiver for providing a control voltage whose magnitude varies as a function of the receiver tuning; pulse generator means for generating an indicating signal occurring during said retrace interval when said receiver is properly tuned, means connecting said control voltage producing means to said pulse generator means whereby said pulse generator means varies the timing of said indicating pulse as a function of the magnitude of said control voltage; and means for coupling said indicating signal to said picture reproducing device.

2. A fine tuning indication system for television receivers of the type including fine tuning control means adjustable to a proper setting for translating a received television signal, a picture reproducing device, and deflection generator means for developing a scanning raster on said picture reproducing device comprising: means for generating an indicating signal, means for applying said indicating signal to said picture reproducing device, means for synchronizing said indicating signal with said scanning raster so that said indicating signal is ineffective to produce an indication in the picture produced by said picture reproducucng device when said fine tuning control means is adjusted to said proper setting, means connected in said receiver to derive a control signal which varies as a function of the setting of said fine tuning control means, and means for applying said control signal to said means for generating an indicating signal to control the timing thereof to produce a tuning error indicating line near one edge of a picture reproduced on said picture reproducing device for adjustments of said fine tuning control means away from said proper setting.

3. A fine tuning indication system for television receivers of the type including fine tuning control means adjustable to a proper setting for translating a received television signal through said receiver, a picture reproducing device and scanning generating means for developing a scanning raster on said picture reproducing device, comprising: means for generating an indicating signal, and means for applying said indicating signal to said picture reproducing device, means coupling said scanning generating means with said means for generating an indicating signal to synchronize said indicating signal with said scanning raster, means connected in said receiver for producing a control signal of a first magnitude for the proper setting of said fine tuning control means and of an increasing magnitude for settings of said fine tuning control means in one direction from said proper setting and of a decreasing magnitude for settings of said fine tuning control means in the other direction from said proper setting, and means for applying said control signal to said means for generating an indicating signal to vary the timing thereof, to produce a tuning error indicating line near one edge of a picture reproduced on said picture reproducing device for adjustments of said fine tuning control means in one direction away from said proper setting, and to produce a tuning error indicating line near the opposite edge of said picture for adjustments of said fine tuning control means in the other direction away from said proper setting.

4. A tuning indication system for television receivers of the type including fine tuning control means for conditioning said receiver to translate any one of a plurality of television signal frequencies, a picture reproducing device, and a deflection wave generator for producing a scanning wave a retrace interval associated with said picture reproducing device, comprising: means connected in said receiver for providing a control voltage whose magnitude varies in one direction or the other as a function of the setting of said fine tuning control means in one direction or the other respectively from the proper setting thereof; a monostable multivibrator coupled to said deflection wave generator; means connecting said multivibrator to said control voltage producing means whereby said multivibrator is responsive to signals from said deflection wave generator to assume a quasi-stable mode of operation which is maintained for a duration of time dependent on the magnitude of said control voltage; output circuit means coupled to said multivibrator for developing an indicating signal occurring during said retrace interval for proper adjustment of said fine tuning control, and either before or after said retrace interval when said fine tuning control is adjusted in one or the other direction respectively from said proper adjustment; and means for coupling said indicating signal to said picture reproducing device.

5. A tuning indication system for television receivers of the type including tunable circuit means for conditioning said receiver to translate any one of a plurality of television signal frequencies, a deflection wave generator for producing a scanning wave having a retrace interval and a triggering pulse recurring at the rate of said scanning wave, and a picture reproducing device, comprising: means connected in said receiver for providing a control voltage whose magnitude varies as a function of the tuning of said tunable circuit means; tuning indicator circuit means coupled to said deflection wave generator and to said control voltage producing means for receiving said triggering pulse and said control voltage means whereby, said tuning indicator circuit means produces an indicating pulse, the timing of which varies as a function of the magnitude of said control voltage such that said indicating pulse occurs during said retrace interval when said tunable circuit means is properly tuned; and means for coupling said indicating pulse to said picture reproducing device.

6. A tuning indication system for television receivers of the type including tunable circuit means for conditioning said receiver to translate any one of a plurality of television signal frequencies, a deflection wave generator for producing scanning waves having a retrace interval and triggering pulses recurring at the rate of said scanning wave, and a picture reproducing device, comprising: means connected in said receiver for providing a control voltage whose magnitude varies as a function of the tuning of said tunable circuit means; pulse generator means coupled to said deflection wave generator for receiving said triggering pulse; means connecting said pulse generator means to said control voltage producing means to produce an indicating pulse, the timing of which varies as a function of the magnitude of said control voltage such that said indicating pulse occurs either before or after said retrace interval depending on the direction of mistuning of said tunable circuit means, and during said retrace interval when said tunable circuit means is properly tuned; and means for coupling said indicating pulse to said picture reproducing device.

7. A tuning indication system for television receivers of the type including tunable circuit means for conditioning said receivers to translate any one of a plurality of television signal frequencies, a deflection wave generator for producing a scanning wave having a retrace interval and a triggering pulse recurring at the rate of said scanning wave, and a picture reproducing device, comprising: means connected in said receiver for providing a control voltage whose magnitude varies as a function of the tuning of said tunable circuit means; a multivibrator circuit coupled to said deflection wave generator for receiving said triggering pulse; means for applying said control voltage from said control voltage producing means to said multivibrator to produce an indicating pulse, the timing of which varies as a function of the magnitude of said control voltage such that said indicating pulse occurs during said retrace interval when said tunable circuit means is properly tuned, and either earlier or later than said retrace interval when said tunable circuit means is mistuned in one direction or the other respectively from a desired tuning condition; and means for coupling said indicating pulse to said picture reproducing device.

8. In a television receiver of the type including a tuner having signal selection circuit means tunable to the frequency of any one of a plurality of television signals each including a sound carrier and a picture carrier; a signal mixer coupled to said signal selection circuit means; a local oscillator coupled to said signal mixer for applying an oscillator wave to said mixer, said signal mixer being operable to heterodyne a selected one of said television signals and said oscillator wave to produce a corresponding signal of intermediate frequency; fine tuning control means for said oscillator to provide adjustment of the frequency of said intermediate frequency signal; an intermediate frequency amplifier coupled to said signal mixer having a frequency response characteristic which sharply attenuates said sound carrier relative to said picture carrier for a proper setting of said fine tuning control means and which is operable to increase the amplitude of said sound carrier relative to said picture carrier for mistuning of said fine tuning control in one direction, and to decrease the amplitude of said sound carrier relative to said picture carrier for mistuning of said fine tuning control in the opposite direction; deflection circuit means coupled to said intermediate frequency amplifier for producing recurrent deflection scanning waves and correspondingly recurrent flyback pulses; a tuning indicator circuit comprising signal translating means coupled to said intermediate frequency amplifier and responsive to a signal resulting from the heterodyning of said sound and picture carriers in said intermediate frequency amplifier to produce a control voltage, the amplitude of which varies in accordance with the amplitude of said sound carrier; a monostable multivibrator having a stable state and a quasi-stable state coupled to said deflection circuit means to receive said flyback pulses, means connecting said multivibrator to be responsive to said flyback pulses to change the operation thereof from said stable to said quasi-stable state, the duration of said quasi-stable state being controlled by the magnitude of said control voltage before automatically returning to said stable state; means for applying said control voltage to said multivibrator; output circuit means coupled to said multivibrator for deriving an indicating signal, the timing of which is controlled by the duration of said quasi-stable state; and picture reproducing means coupled to receive said indicating signal.

References Cited in the file of this patent

UNITED STATES PATENTS

| | | |
|---|---|---|
| 2,194,516 | Anderson | Mar. 26, 1940 |
| 2,904,630 | Bruch | Sept. 15, 1959 |